Dec. 5, 1939.    A. C. TAMKE    2,182,710
KNIFE PEELER
Filed March 14, 1938
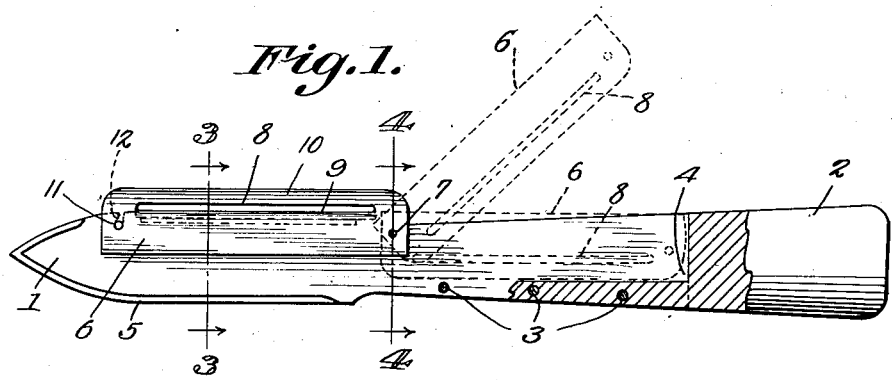
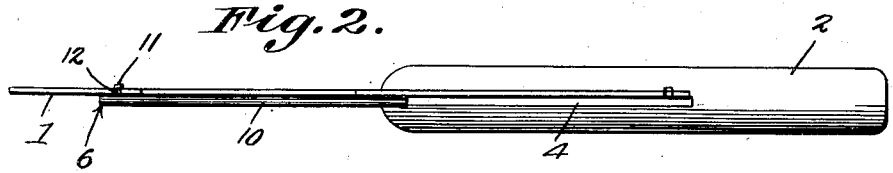
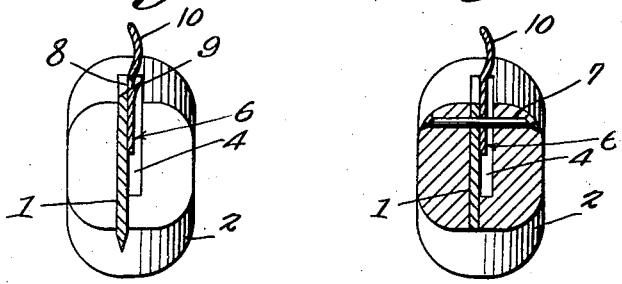
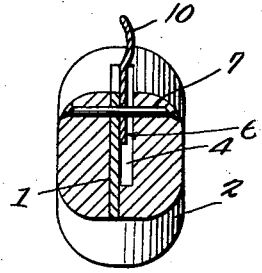
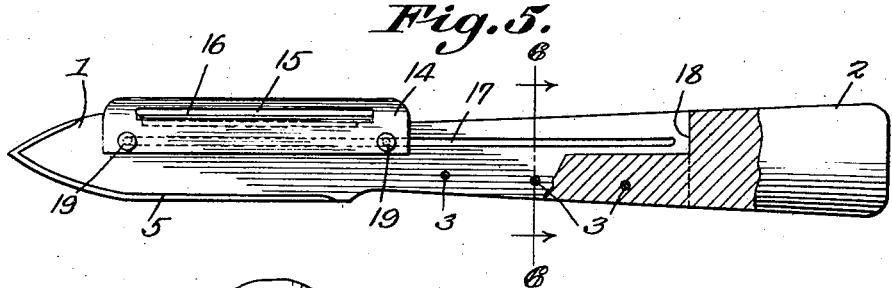
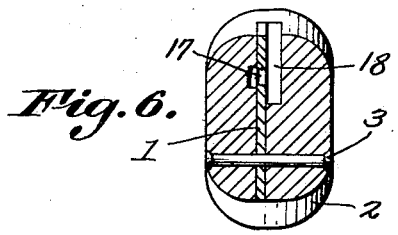
A.C. Tamke
INVENTOR.
BY C.A. Snow & Co.
ATTORNEYS.

Patented Dec. 5, 1939

2,182,710

UNITED STATES PATENT OFFICE 2,182,710

KNIFE PEELER

Alfred C. Tamke, St. Albans, N. Y.

Application March 14, 1938, Serial No. 195,892

2 Claims. (Cl. 30—278)

This invention relates to improvements in paring knives, and more particularly to a peeling attachment suitably supported upon the paring knife, and adapted to be positioned on the back of the blade when the peeling attachment is to be used, and means whereby the peeling attachment may be received within a slot within the handle of the paring knife when the same is not being used.

An object of my invention is to provide an improved paring knife formed with the peeling attachment which will be arranged for positioning upon the back of the knife blade when the peeling attachment is to be used, and which will be housed within the handle of the paring knife when the peeling attachment is not being used, together with means for locking the peeling attachment in operative position.

Another object of my invention is to provide a paring knife with a peeling attachment which will be pivotally supported upon the rear end of the blade, and will swing into locking engagement with the back of the blade when the peeling attachment is to be used, and will swing into a slot formed in the handle of the paring knife when the peeling attachment is not to be used.

A further object of my invention is to provide a paring knife formed with a peeling attachment which will be slidably supported upon the knife blade, in its extended position to interlock upon the back of the knife blade in its operative position, and in its inoperative position to be slid back within a recess formed in the handle of the paring knife where it will be out of the way, and ready for instant use by merely flipping the attachment forwardly on the blade.

A still further object of my invention is to provide a paring knife having a peeling attachment which will be formed with an enclosed cutting edge and a rolled guard at the forward edge of said attachment whereby the same will slide readily over the article being peeled, also means being provided whereby the peelings will be discharged upwardly and away from the knife blade through an opening between the same and the guard portion of the attachment.

Other objects will appear as the description proceeds.

In the accompanying drawing which forms a part of my application,

Figure 1 is a side elevation of a paring knife formed with my improved peeling attachment, and showing in dotted lines the manner in which the attachment may be swung backwardly from the blade and into the recess in the handle of the paring knife;

Figure 2 is a plan view of a paring knife showing my improved peeling attachment in operative position thereon;

Figure 3 is a sectional view taken on the line 3—3 of Figure 1;

Figure 4 is a sectional view taken on the line 4—4 of Figure 1;

Figure 5 is a side elevation of a paring knife showing a modified form of peeling attachment positioned thereon adapted to be slid into operative position on the blade of the knife or to be slid backward into the handle of the knife when not in use, and Figure 6 is a sectional view taken on the line 6—6 of Figure 5.

Like characters of reference are used throughout the following specification and the accompanying drawing to designate corresponding parts.

In carrying out my invention, I provide a paring knife having a blade 1, and a handle 2 suitably connected thereto, as by means of the rivet 3. A slot 4 is formed in the handle portion of the paring knife, and is adapted to receive the peeling attachment when the same is in inoperative position.

The preferred embodiment of my invention is illustrated in Figures 1 to 4 inclusive. The blade 1 of the paring knife is formed with a sharpened cutting edge 5, which extends along the full length of the blade on one side, and a slight distance along the other side of the blade, as clearly illustrated in Figure 1 of the drawing. It will be readily understood that the sharpened point of the knife blade may be used for digging out imperfections in the fruit or vegetables being pared.

The preferred form of my invention comprises a peeling attachment or member 6 pivoted to the knife blade on the pin 7, and formed with a longitudinally extending slot 8. The edge of the slot 8 adjacent to or nearest the cutting edge of the blade 1 is sharpened to form a cutting or peeling edge 9, while the outer edge of the peeling attachment is rolled as at 10 to provide a bearing surface, whereby the knife with the peeling attachment in its operative position will readily slide over the fruit or vegetable being peeled. A locking stud 11 will be carried at the free or outer end of the peeling attachment or member 6, and will cooperate with a locking slot 12 formed in the back of the knife blade 1 at a point adjacent to the point of the said blade.

It will be apparent that when the peeling attachment is in its operative position, the peelings from the fruit or vegetables being pared will pass upwardly through the slot 8 in the attachment, and away from the peeling edge of the said attachment. When it is not desired to use the attachment, the same may be swung around on the pivot pin 7 until the attachment is completely enclosed within the slot 4 in the handle 2, as illustrated in dotted lines in Figure 1, thereby permitting the paring knife to be used as such. A locking slot 13 will be formed in one edge of the slot 8 in the handle 2 so that the stud 11 on the peeling attachment may be received therein, when the said attachment is in inoperative or housed position.

In Figures 5 and 6 I have illustrated a modification of my invention, the main points of difference being that the peeling attachment 14 is slidable on the blade 1, instead of being pivoted thereto as in the preferred embodiment of my invention. The peeling attachment 14 will be provided with a slot 15, and with a cutting edge 16 formed similarly to the attachment illustrated in Figures 1 to 4 inclusive. A guide groove 17 will be formed longitudinally of the cutting blade 1 of the paring knife, and a slot 18 will be formed in the handle 2, in which the peeling attachment may be slidably received when the same is not to be used. Transversely disposed bearing pins 19 extend through the peeling attachment 14 and through the blade 1, and are adapted to slidably engage the groove 17 formed in the blade 1, as clearly illustrated in the drawing, and when the attachment is to be used, it will be slid towards its outer or extended position as illustrated in Figure 5, and the paring knife used in a backward cutting motion, as differentiated from a forward motion which will be used when the cutting edge 5 of the paring knife is being used for cutting purposes.

From the foregoing description it will be apparent that I have devised a highly efficient form of paring knife with a peeling attachment, which will be readily received within the handle of the paring knife when not in use, but which may be readily positioned on the back of the blade of the paring knife adjacent the point thereof, when the said peeling attachment is to be used.

It will be understood that I do not intend to limit myself to the precise embodiment of the invention as hereinbefore described, and it will be understood that many minor changes in detail of construction may be resorted to without departing from the spirit of the invention.

Having thus described my invention what I claim as new and desire to secure by Letters Patent of the United States is:

1. In a paring knife, a knife blade having the rear edge thereof beveled, a handle to which the blade is secured, said handle having a slot formed therein adjacent to the rear edge of the blade, a paring blade pivotally connected to the knife blade at a point near the handle, said knife blade having a slot extending inwardly from the back edge thereof at a point adjacent to the free end of the knife blade, a stud carried by the paring blade and adapted to move into the slot, holding the paring blade against accidental movement with respect to the knife blade, said paring blade having a cutting edge forming a continuation of the beveled rear edge of the knife blade when the paring blade is in its active position, and said paring blade adapted to swing from a position over the rear edge of the knife blade, to a position within the slot of the handle.

2. In a paring knife, a knife blade, a handle to which the blade is secured, said handle having a slot formed in the rear edge thereof adjacent to the knife blade, a pivoted paring blade mounted on the knife blade adjacent to the handle and adapted to swing from a position within the slot of the handle to a position over the rear edge of the blade, means for restricting movement of the pivoted paring blade with respect to the knife blade, said paring blade having a slot formed longitudinally thereof, one edge of the slot being extended rearwardly providing a cutting edge, the cutting edge forming a continuation of the rear edge of the knife blade so that parings may pass therethrough and over the knife blade, and means for gaging the depth of cut of the paring blade.

ALFRED C. TAMKE.